(12) United States Patent
Senba et al.

(10) Patent No.: US 7,630,626 B2
(45) Date of Patent: Dec. 8, 2009

(54) CAMERA SYSTEM

(75) Inventors: Takehiko Senba, Asaka (JP); Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 539 days.

(21) Appl. No.: 11/481,923

(22) Filed: Jul. 7, 2006

(65) Prior Publication Data
US 2007/0019098 A1    Jan. 25, 2007

(30) Foreign Application Priority Data
Jul. 7, 2005    (JP) .............................. 2005-199224

(51) Int. Cl.
G03B 13/02 (2006.01)
G03B 13/08 (2006.01)

(52) U.S. Cl. ...................... 396/383; 396/385
(58) Field of Classification Search ................ 396/141, 396/148, 150, 152, 373, 374, 378, 382, 383, 396/384, 385, 386; 348/341
See application file for complete search history.

(56) References Cited

U.S. PATENT DOCUMENTS

| | | | | |
|---|---|---|---|---|
| 4,165,933 A | * | 8/1979 | Sunouchi et al. ............ 396/354 |
| 4,525,744 A | * | 6/1985 | Nakamura et al. ........... 348/341 |
| 4,757,388 A | * | 7/1988 | Someya et al. ............. 348/211.6 |
| 6,778,218 B1 | * | 8/2004 | Higuchi et al. .............. 348/344 |
| 2002/0191097 A1 | * | 12/2002 | Kobayashi ................... 348/341 |

FOREIGN PATENT DOCUMENTS

| | | |
|---|---|---|
| JP | 5-341356 A | 12/1993 |
| JP | 8-082838 A | 3/1996 |

* cited by examiner

*Primary Examiner*—Rodney E Fuller
(74) *Attorney, Agent, or Firm*—Sughrue Mion, PLLC

(57) ABSTRACT

A camera system includes a conventional single-lens reflex function. A camera head includes a finder support section which detachably supports an optical finder unit. When the optical finder unit is attached to the finder support section, the camera becomes a camera system having a single-lens reflex function. In the camera head, a half mirror is provided on the optical path of an image pickup lens. A subject reflected by the half mirror is formed on the side of a finder unit. A subject light passing through the half mirror is formed on an image pickup device. That is, the camera becomes a single-lens reflex camera in which the half mirror is used for a reflex plate.

6 Claims, 6 Drawing Sheets

CAMERA SYSTEM

BACKGROUND OF THE INVENTION

1. Field of the Invention

The present invention relates to a camera system comprising a camera head including an image pickup optical system and an image pickup device, and a camera main body on which the camera head is detachably attached.

2. Description of the Related Art

Instead of a conventional camera system to which an interchangeable lens is attached in an interchangeable manner to pickup an image, there is proposed a camera system comprising a camera head including an image pickup optical system and an image pickup device, and a camera main body on which the camera head is detachably attached. In such a camera system, if a display screen is provided on the side of the camera main body, the display screen can be used as the finder. If the camera head is provided with the image pickup device, a finder called EVF (Electric View Finder) can be provided on the side of the camera head using an image produced by the image pickup device.

In a single-lens reflex camera, it is absolutely necessary to provide a mirror for reflecting a subject on the side of the finder due to its structure. Therefore, there is a problem that the finder optical system is increased in size, and the entire finder is increased in size (see Japanese Patent Applications Laid-open No. 5-341356 and No. 8-82838 for example).

However, the finder of the single-lens reflex camera has a merit that a subject seen by the image pickup optical system can be recognized as it is unlike the EVF and thus, a cameraman called a high amateur having higher skills than a professional cameraman preferably use such a finder.

Makers of the camera systems desire to provide camera systems having excellent usability for all users including beginners and skilled cameramen called the high amateurs. From such a viewpoint also, it is desired that it is possible for beginners to pickup image using the display screen instead of the finder, and for the high amateurs to pickup image using the finder, while reducing the camera system in size.

SUMMARY OF THE INVENTION

The present invention has been made in view of the above circumstances and provides a compact camera system which has the conventional single-lens reflex function and which can be used by a wide spectrum of users from beginners to the high amateurs.

A first camera system according to the invention comprises a camera head including an image pickup optical system and an image pickup device, and a camera main body to which the camera head is detachably attached, the camera system further comprises an optical finder unit which is detachably attached to the camera head, the camera head includes a finder support section which detachably supports the optical finder unit, and a half mirror through which subject light emitted through the image pickup optical system passes to form a subject image on the image pickup device, and which reflects the subject light to allow a user to visually recognize a subject through an optical finder unit mounted on the camera head.

According to the first camera system of the invention, if the optical finder unit is detachably attached to the camera head and the finder unit is reliably supported by the finder support section, the half mirror exhibits the single-lens reflex function and the camera system suitable for the high amateurs. If the finder unit is detached from the camera head, the camera system becomes compact and the display screen located on the side of the main body, and the camera system is suitable for beginners.

That is, there is realized a compact camera system which has the conventional single-lens reflex function and which can be used by a wide spectrum of users from beginners to the high amateurs.

A second camera system according to the invention comprises a camera head having an image pickup optical system and an image pickup device, and a camera main body to which the camera head is detachably attached, the camera system comprising:

an optical finder unit which is detachably attached to the camera head, wherein the camera head comprises:

a finder support section which detachably supports the optical finder unit, and a half mirror which evacuates to an evacuation position from an optical axis of a subject light which enters through the image pickup optical system and which is formed into an image on the image pickup device when the optical finder unit is not mounted, and which moves to an optical path, when the optical finder unit is mounted, for causing subject light emitted through the image pickup optical system to pass through itself and to be focused into an image on the image pickup device, and for reflecting the subject light which passes through the optical finder unit such that a user can visually recognize the subject.

The structure of the first camera system has no problem, but according to the structure of the first camera system, when the finder unit is not attached, i.e., when a beginner tries to pickup image using this camera system, since the half mirror is stationary attached to the image pickup optical path, image pickup light amount runs short.

According to the second camera system of the invention, if the half mirror is disposed on the optical path of the image pickup optical system, the image pickup light amount is reduced to half. Thus, this fact is taken into consideration, and when the finder unit is not attached, the half mirror is not disposed on the optical path and is evacuated to the evacuation position. According to the structure of the second camera system, for beginners, it is possible to provide a camera system having excellent usability so that the user can easily pickup image, and for high amateurs; it is possible to provide a camera system which functions as the single-lens reflex camera by attaching the finder unit.

It is preferable that the camera main body includes a second finder support section which detachably supports the optical finder unit in corporation with the finder support section included in the camera head, the optical finder unit is simultaneously mounted on both the finder support section included in the lens unit and the second finder support section included in the camera main body.

If the optical finder unit is simultaneously mounted on both the finder support section on the side of the camera head and the second finder support section on the side of the camera main body, the finder unit is more reliably supported by the camera head and the camera main body as compared with a case where the finder unit is mounted only on the camera head. That is, the strength of the finder support section comprising both the first finder support section and second finder support section is further enhanced.

It is preferable that the optical finder unit includes a screen which allows a user to visually recognize, from outside of the optical finder unit, the subject image projected from inside of the optical finder unit, and a finder optical system which forms, on the screen, an image of subject light emitted from the image pickup optical system and the half mirror, and it is also preferable that the camera system further comprises an optical magnifying unit which allows a user to visually recognize, in a magnified manner, a subject image projected on the screen of the optical finder unit supported by the finder support section, and which is detachably attached to the camera main body, the camera main body includes a magnifying unit support section which detachably supports the optical magnifying unit.

If a subject on the screen can be visually recognized from a position away from the finder, its effect is exhibited when sports image is picked up, and even when a user takes his or her eye off the finder, it is possible to pickup image while seeing the subject on the screen.

It is also preferable that the camera system according to claim 1, further comprises:

a mirror moving section which moves the half mirror between an application position in which the half mirror causes subject light emitted through the image pickup optical system to pass through itself and to be focused into an image on the image pickup device, and to reflect the subject light which passes through the optical finder unit such that a user can visually recognize the subject, and a evacuation position to which the half mirror evacuates from an optical axis of a subject light which enters through the image pickup optical system which is focused into an image on the image pickup device, and a mirror position instructing section which instructs the application position and the evacuation position by operation, wherein the mirror moving section moves the half mirror to a position instructed by the mirror position instructing section.

With this, it becomes possible to move the half mirror to the application position or to the evacuation position in accordance with the operation of the mirror position selecting section, and a user can freely select the single-lens reflex function or a normal digital camera function.

As explained above, the invention realizes a compact camera system which has the conventional single-lens reflex function and which can be used by a wide spectrum of users from beginners to the high amateurs.

BRIEF DESCRIPTION OF THE DRAWINGS

FIGS. 2 and 3 are combined with each other.

DETAILED DESCRIPTION OF THE INVENTION

Embodiments of the present invention will be explained with reference to the drawings.

FIGS. 1 (a) and (b) show a configuration of a camera system 1 according to an embodiment of the present invention.

Figure 1A:
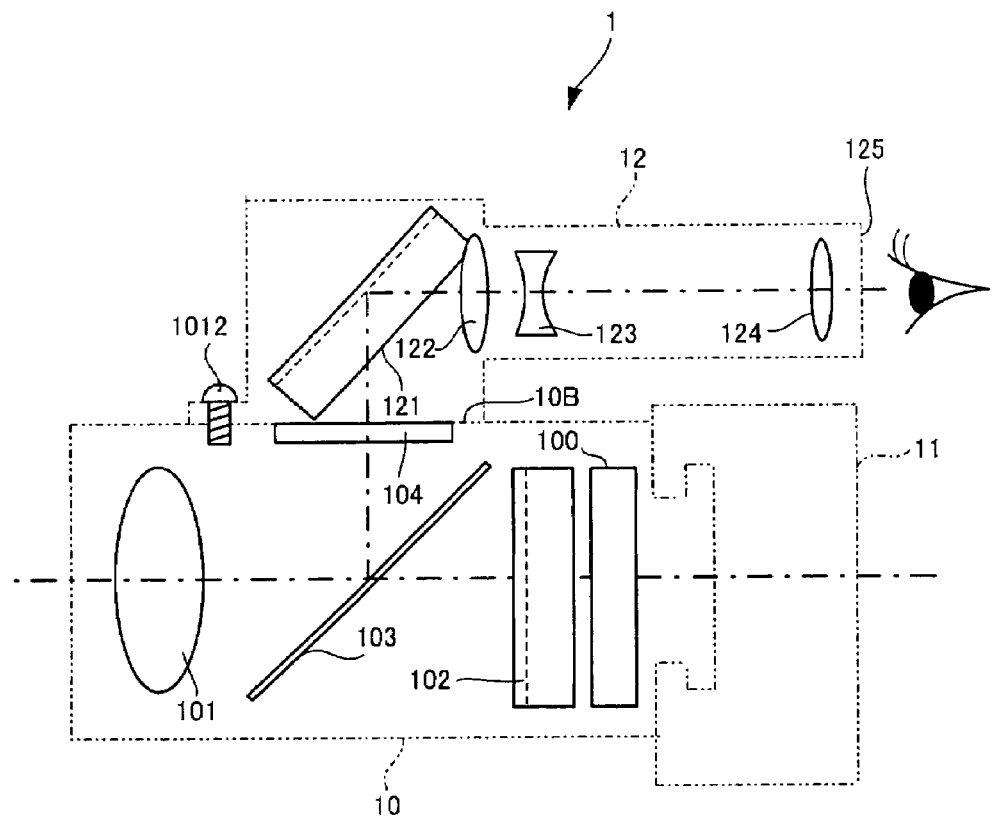
FIG. 1 (a) and FIG. 1 (b) are diagrams showing a configuration of a camera system according to an embodiment of the present invention.
Figure 1B:
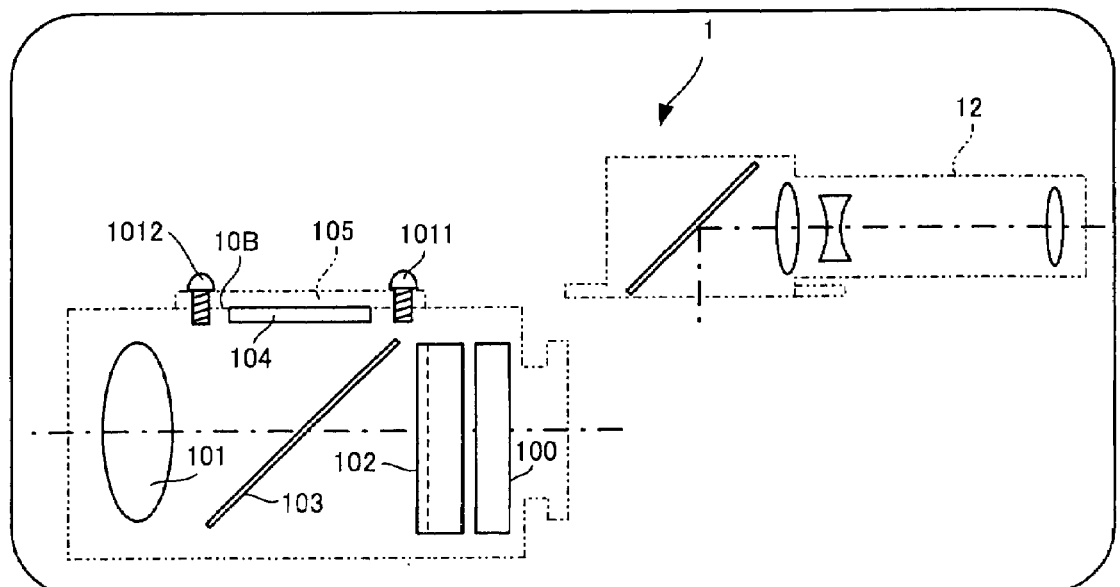

FIGS. 1(a) and (b) show the configuration of the camera system 1 when an optical finder unit 12 is attached, and FIG. 1(b) shows the configuration of the camera system 1 when the optical finder unit 12 is not attached.

The camera system 1 shown in FIGS. 1(a) and 1(b) includes a camera head 10 having an image pickup lens 101 and an image pickup device 102, and a camera main body 11 to which the camera head 10 is detachably attached. The camera head 10 includes a drive unit 100 comprising a processor for driving the image pickup device 102, the image pickup lens 101 and the like. Therefore, the camera main body 11 of the camera system 1 only has a function for receiving image data produced by the image pickup device 102 on the side of the camera head 10 to record the image data in a recording medium, and for reproducing and displaying an image based on the image data on a display screen. That is, the camera main body 11 of the camera system 1 of the embodiment is an image recording/reproducing device.

The camera system 1 shown in FIGS. 1(a) and 1(b) also includes the optical finder unit 12 as an option unit. The optical finder unit 12 is attached to the camera head 10. The camera head 10 includes a finder support section 10B and a half mirror 103. The finder support section 10B detachably supports the optical finder unit 12. Subject light emitted through the image pickup lens 101 passes through the half mirror 103 to form a subject image on the image pickup device 102, and the half mirror 103 reflects the subject light to allow a user to visually recognize the subject through the optical finder unit 12 attached to the camera head 10.

In the finder support section 10B of the camera head 10, Female screws are formed at a predetermined distance from each other as shown in FIG. 1(b). Male setscrews 1011 and 1012 are threadedly inserted in the female screws, thereby fixing the finder lid 105. If the setscrews 1011 and 1012 are detached and the finder lid 105 is detached, a dustproof window 104 is exposed. In this example, an objective end on the side of the optical finder unit 12 is disposed such that the objective end is in contact with the dustproof window 104, and the objective end is attached to the finder support section 101. Then, the optical finder unit 12 is reliably supported by the camera head 10 through one of the two setscrews, i.e., the securing screw 1012. The optical finder unit 12 is provided with a mirror 121 for reflecting subject light reflected by the half mirror 103 toward the finder eye-contact section 124. Lenses 122, 123 and 124 are disposed at predetermined locations for bringing the subject light reflected by the mirror 121 into focus and for introducing the same to an eye-contact section 125.

With this, since the optical finder unit 12 is attachable and detachable, the optical finder unit 12 can be detached from the camera head 10 and the camera head 10 can be carried when portability is important, the camera system can be used like a digital camera when a beginner uses this camera system, and the camera system can also be used like the single-lens reflex camera by attaching the optical finder unit when a high amateur uses the camera system. When a beginner uses this camera system without attaching the optical finder unit, since there is no finder, the camera system is reduced in size by the optical finder unit, since the optical finder unit is attachable and detachable.

As explained above, it is possible to realize a compact camera system which has the conventional single-lens reflex function and which can be used by a wide spectrum of users from beginners to the high amateurs.

Although the securing screws are used in the embodiment, a slide rail structure having a lock may be substituted for the setscrews.

Figure 2:
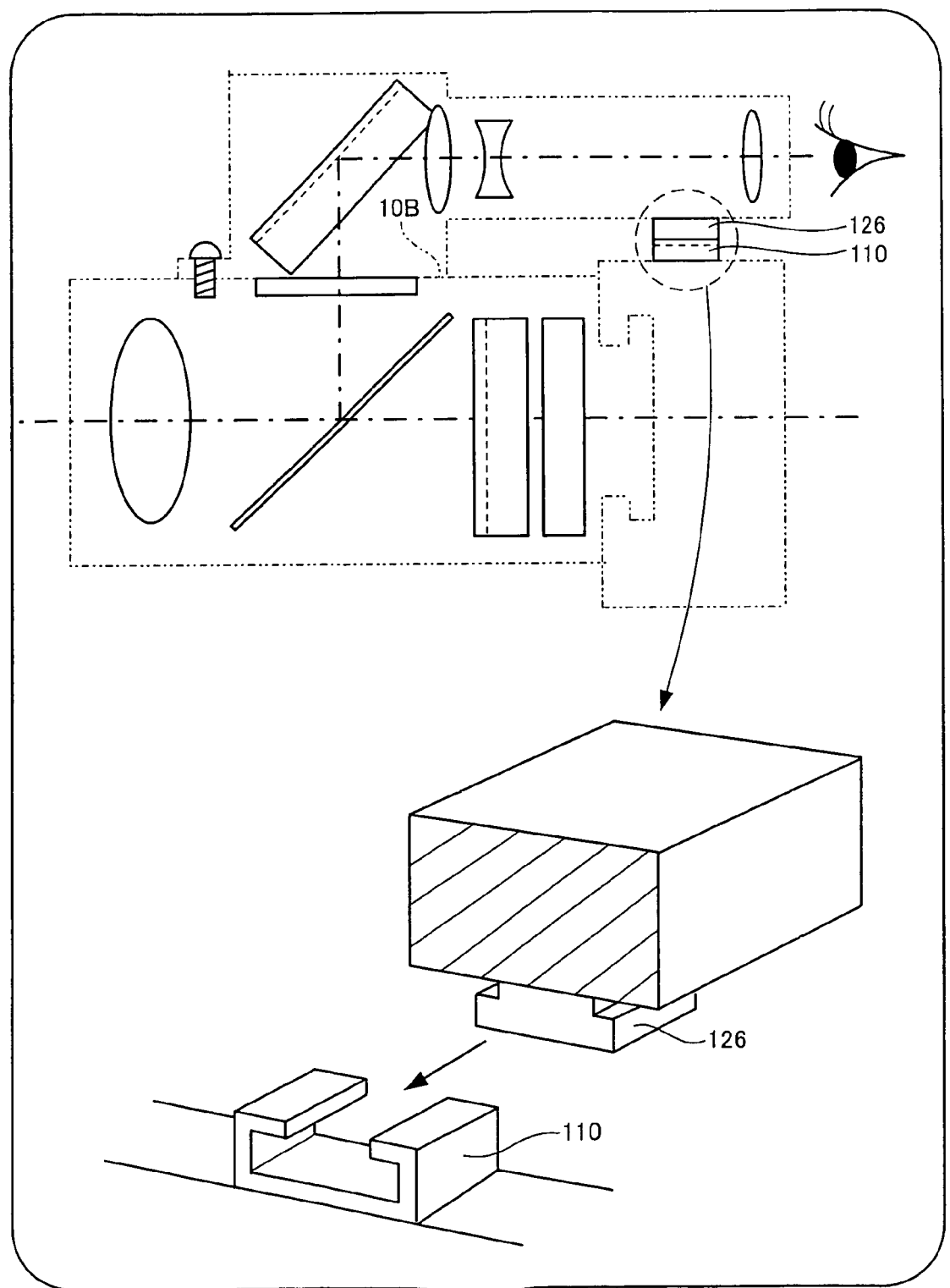
FIG. 2 is a diagram showing a modification of FIGS. 1(a) and 1(b)

FIG. 2 shows a modification of FIG. 1.

In FIG. 1, since the finder support section 101 of the optical finder unit 12 is provided only on the side of the camera head 10, if the entire optical path of the optical finder unit 12 becomes long, the stability of the optical finder unit is deteriorated.

Hence, in addition to the finder support section 10B on the side of the camera head 10, the camera main body 11 is provided with an accessory shoe 110 and a mounting section 126 of the optical finder unit 12 is mounted also on the accessory shoe 110. With this, the supporting structure of the finder unit can be strengthened.

In other words, the camera main body 11 includes a second finder support section 110 which detachably supports the optical finder unit 12 in cooperation with the finder support section 101 of the camera head 10, and the optical finder unit 12 is simultaneously attached to both the finder support section 101 of the lens unit 10 and the second finder support section 110 of the camera main body 11.

With this, the strength of the finder supporting structure which supports the optical finder unit 12 is enhanced.

Figure 3:
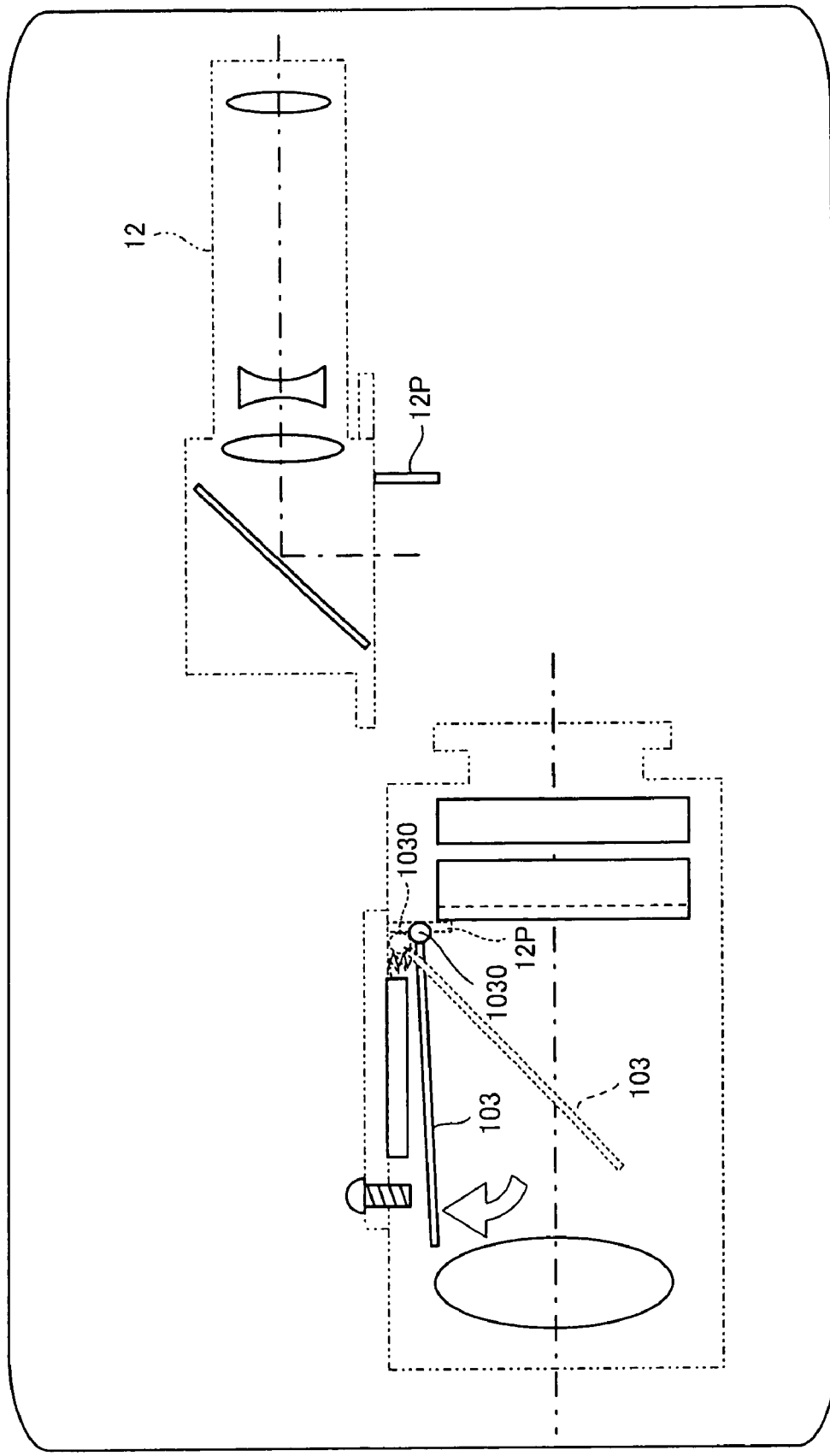
FIG. 3 is a diagram showing a second embodiment.

FIG. 3 shows a second embodiment.

In the first embodiment, the half mirror 103 is left stationary in the image pickup optical path no matter whether or not the optical finder unit 12 is used. If the half mirror 103 is left stationary in the application position (on the optical path inclined at 45° with respect to the optical axis), the image pickup light amount is reduced to a half. Thus, when the optical finder is not used, the half mirror is evacuated to the evacuation position. With this, the amount of image pickup light reaching the image pickup device can sufficiently be secured.

In the example shown in FIG. 3, one end of the half mirror 103 is rotatably supported on a rotation shaft 1030, and when the optical finder unit 12 is attached, the rotation shaft 1030 is pushed leftward (shown with dotted line) in FIG. 3 by the projection pin 12P provided on the side of the optical finder unit, the half mirror 103 is moved on the optical path (position shown with dotted line), and when the optical finder unit 12 is detached, the pushing force against the rotation shaft 1030 is released, thereby moving the rotation shaft 1030 rightward in FIG. 3. With this, the half mirror 103 is evacuated from the optical path by a biasing force of a spring.

When an image is picked up using the camera system like a digital camera without attaching the finder unit, the amount of light at the time of image pickup runs short. However, with the above configuration, this problem can be solved. When the camera system is used like a single-lens reflex camera, the subject light can be introduced toward the finder by the half mirror, and the same subject as that of the image pickup optical system can be observed by the finder.

A third embodiment will be explained with reference to FIG. 4.

Figure 4:
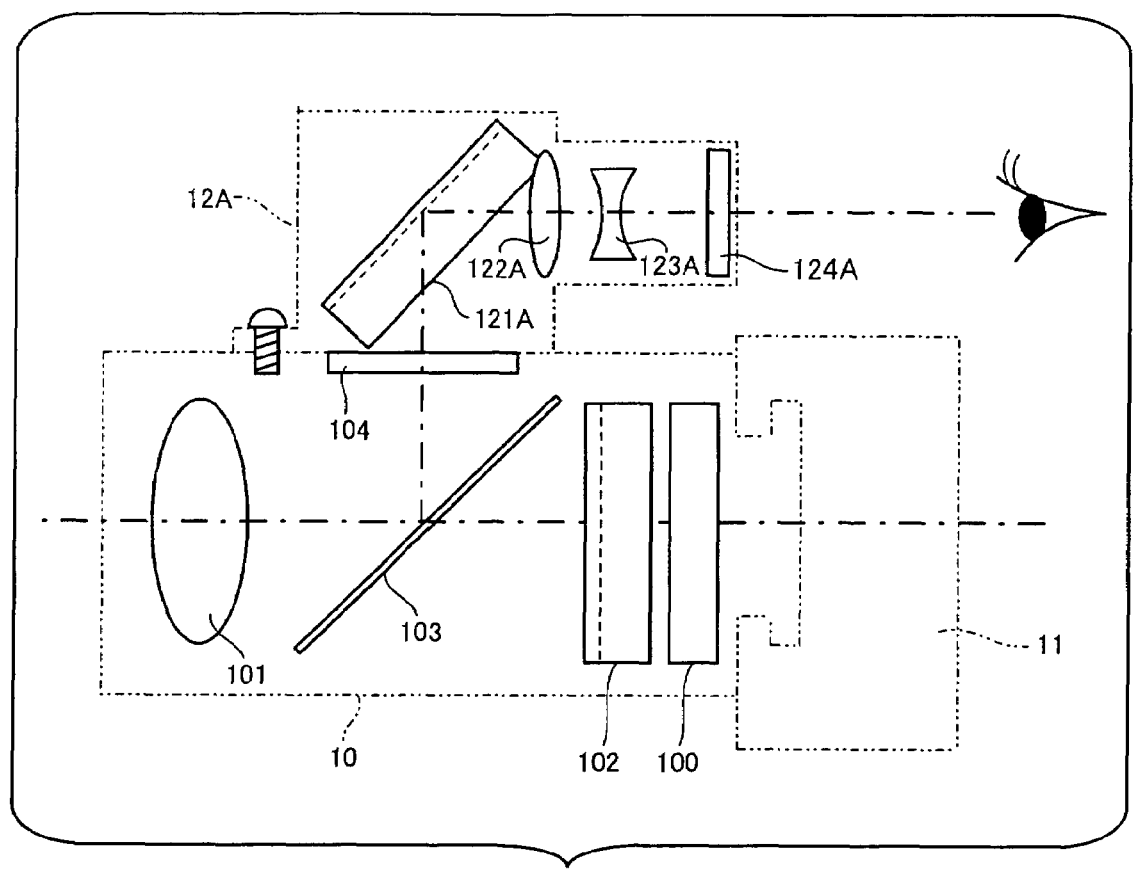
FIG. 4 is a diagram used for explaining a third embodiment.

As shown in FIG. 4, an optical finder unit 12A includes a screen 124A and finder optical systems 121A, 122A and 123A. The screen 124A allows a user to visually recognize, from outside of the optical finder unit 12A, a subject image projected from inside of the optical finder unit. The finder optical systems 121A, 122A and 123A form the subject light emitted through the image pickup lens 101 and the half mirror 103 on the screen 124A.

With this, a user can visually observe the subject from a position away from an image projected on the screen 124A.

Figure 5:
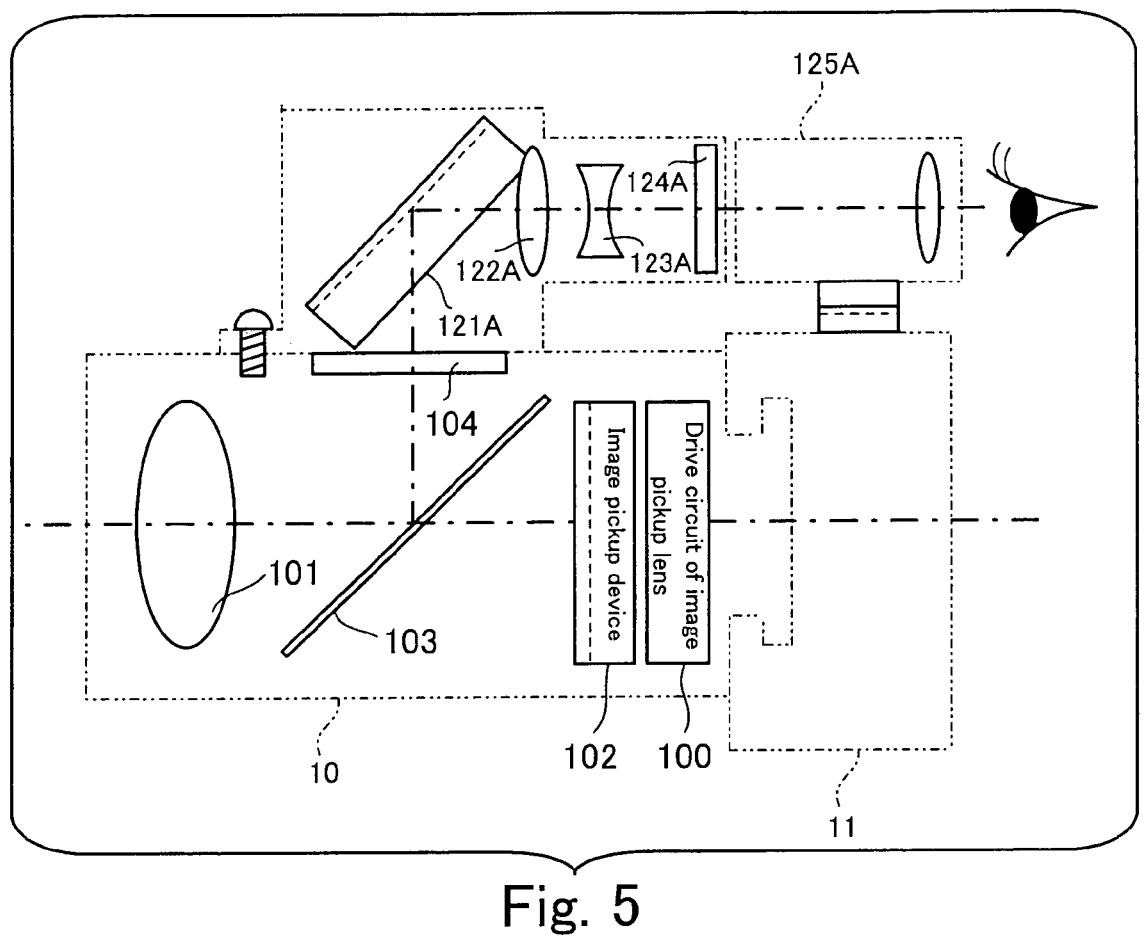
FIG. 5 is a diagram used for explaining a modification of FIG. 4.

A modification of FIG. 4 will be explained with reference to FIG. 5.

The camera system includes an optical magnifying unit 125A. The optical magnifying unit 125A allows a user to visually recognize, in an enlarged manner, a subject image projected on the screen 124A of the optical finder unit 12A supported by the finder support section 101 of the camera head 10. The optical magnifying unit 125A is detachably attached to the camera head 10. The camera head 10 includes a magnifying unit support section 110A which detachably supports the optical magnifying unit 125A.

With this, when a user visually observes a subject on the screen from a position away from the screen, the user can observe the subject more clearly.

Figure 6A:
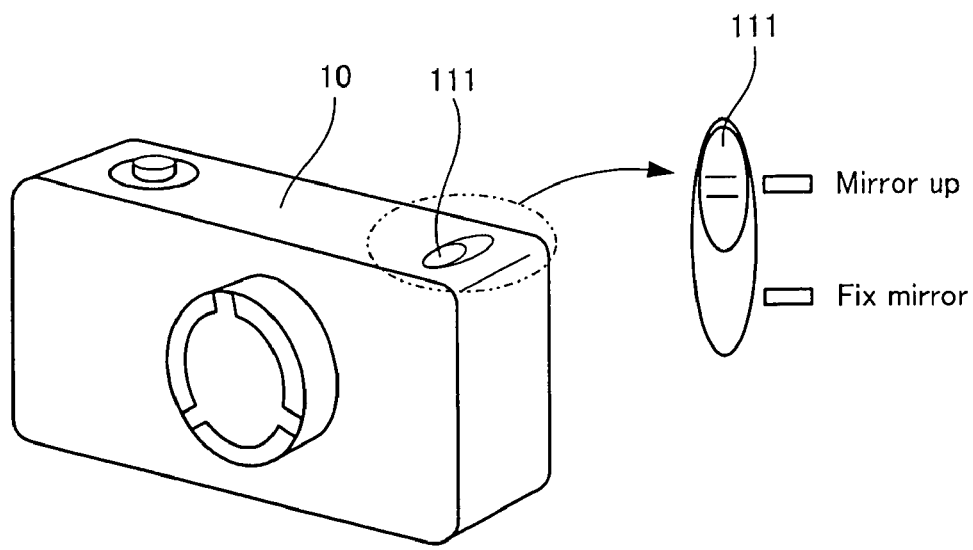
FIG. 6 (a) and FIG. 6 (b) are diagrams used for explaining a modification when
Figure 6B:
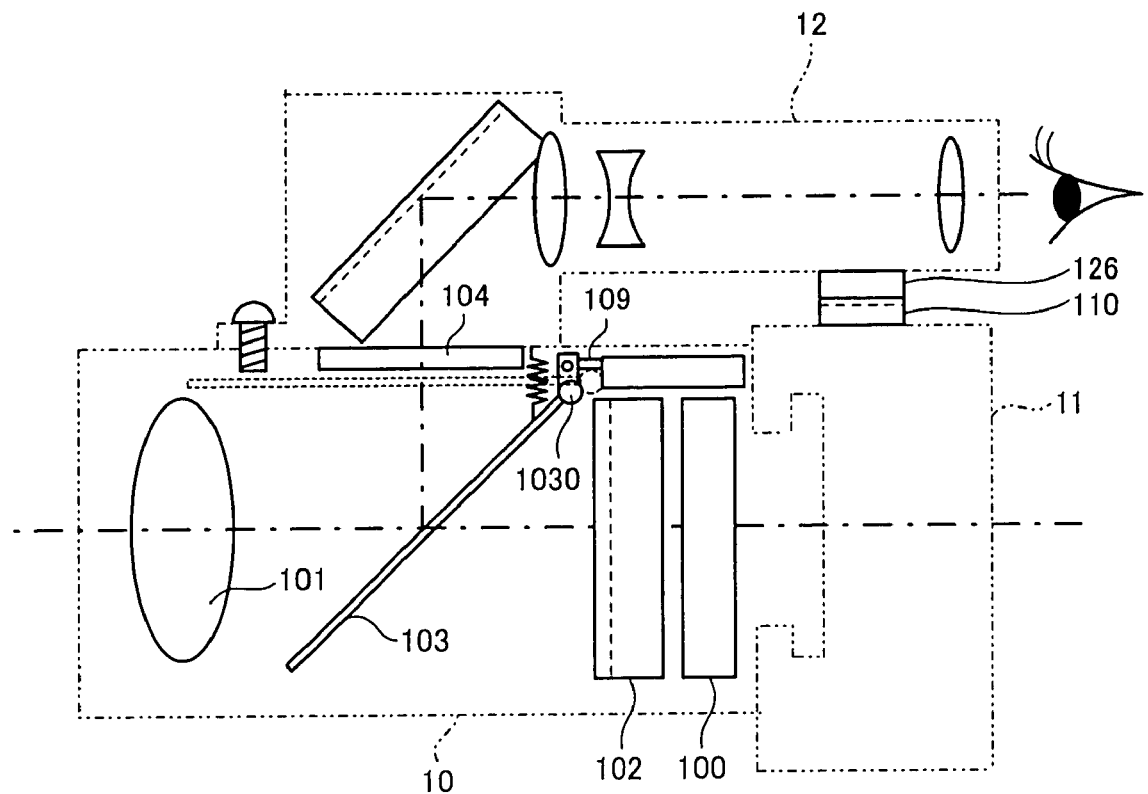

FIG. 6 is used for explaining a configuration in which a user can select movement of the half mirror to the application position or the evacuation position.

In FIG. 3, when the optical finder unit 12 is attached to the camera head 10, the rotation shaft 1030 is pushed by the projection pin 12P provided on the optical finder unit 12, thereby moving the half mirror 103 to the application position, and when the optical finder unit 12 is detached, the pushing force against the projection pin 12P is released, thereby moving the half mirror 103 to the evacuation position. An operation element 111 and a plunger 109 which laterally moves in association with operation of the operation element 111 are provided in the vicinity of the rotation shaft 1030 instead of the projection pin 12P. A tip end of the plunger 109 is moved leftward in accordance with operation of the operation element 111 to push the rotation shaft 1030, thereby moving the half mirror 103 to the application position, the tip end of the plunger 109 is moved rightward in the drawing to release the pushing force against the rotation shaft 1030, thereby moving the half mirror 103 to the evacuation position.

A lens attaching section is located on a central portion of the camera body of the camera head 10 shown in FIG. 6. An operation element 111 which is a mirror position instructing section of the invention is provided on an upper surface of the camera body. Instructions for moving the half mirror 103 to the application position or the evacuation position are given through the operation element 111. The rotation shaft 1030 is pushed by the projection pin 12P on the side of the finder unit in FIG. 3. In the example shown in FIG. 6, the plunger 109 moves leftward in association with a mirror-up operation of the operation element 111, the rotation shaft 1030 is pushed leftward by the movement of the plunger 109, and the half mirror 103 moves to the optical path shown in FIG. 6. If the operation element 111 is operated to the mirror-up side, the tip end of the plunger 109 moves rightward such that the pushing force against the plunger 109 is released. Then as the rotation shaft 1030 is pushed rightward, the half mirror 103 evacuates to the evacuation position.

With this, it is possible to move the half mirror 103 to the application position or the evacuation position in accordance with a judgment of a user.

That is, this camera system can be used like a single-lens reflex camera or a digital camera depending upon a judgment of a user who operates the operation element.

As explained above, it is possible to realize a compact camera system which has the conventional single-lens reflex function and which can be used by a wide spectrum of users from beginners to the high amateurs.

What is claimed is:

1. A camera system including a camera head having an image pickup optical system and an image pickup device, and a camera main body to which the camera head is detachably attached, the camera system comprising:

an optical finder unit which is detachably attached to the camera head, wherein the camera head comprises:

a finder support section which detachably supports the optical finder unit, and a half mirror which causes subject light emitted through the image pickup optical system to pass through itself and to be focused into an image on the image pickup device, and which reflects the subject light which passes through the optical finder unit such that a user can visually recognize the subject, wherein the camera main body comprises:

a second finder support section which detachably supports the optical finder unit in corporation with the finder support section included in the camera head, wherein the optical finder unit is simultaneously mounted on both the finder support section included in the lens unit and the second finder support section included in the camera main body.

2. A camera system including a camera head having an image pickup optical system and an image pickup device, and a camera main body to which the camera head is detachably attached, the camera system comprising:

an optical finder unit which is detachably attached to the camera head, wherein the camera head comprises:

a finder support section which detachably supports the optical finder unit, and a half mirror which evacuates to an evacuation position from an optical axis of a subject light which enters through the image pickup optical system and which is formed into an image on the image pickup device when the optical finder unit is not mounted, and which moves to an optical path, when the optical finder unit is mounted, for causing subject light emitted through the image pickup optical system to pass through itself and to be formed into an image on the image pickup device, and for reflecting the subject light which passes through the optical finder unit such that a user can visually recognize the subject.

3. The camera system according to claim 2, wherein the camera main body comprises:

a second finder support section which detachably supports the optical finder unit in corporation with the finder support section included in the camera head, wherein the optical finder unit is simultaneously mounted on both the finder support section included in the lens unit and the second finder support section included in the camera main body.

4. The camera system according to claim 2, wherein the optical finder unit comprises:

a screen which allows a user to visually recognize, from outside of the optical finder unit, the subject image projected from inside of the optical finder unit, and a finder optical system which forms, on the screen, an image of subject light emitted from the image pickup optical system and the half mirror.

5. The camera system according to claim 4, further comprising:

an optical magnifying unit which allows a user to visually recognize, in a magnified manner, a subject image projected on the screen of the optical finder unit supported by the finder support section, and which is detachably attached to the camera main body, wherein the camera main body includes a magnifying unit support section which detachably supports the optical magnifying unit.

6. A camera system including a camera head having an image pickup optical system and an image pickup device, and a camera main body to which the camera head is detachably attached, the camera system comprising:

an optical finder unit which is detachably attached to the camera head, wherein the camera head comprises:

a finder support section which detachably supports the optical finder unit;

a half mirror which causes subject light emitted through the image pickup optical system to pass through itself and to be focused into an image on the image pickup device, and which reflects the subject light which passes through the optical finder t nit such that a user can visually recognize the subject;

a mirror moving section which moves the half mirror between an application position in which the half mirror causes subject light emitted through the image pickup optical system to pass through itself and to be focused into an image on the image pickup device, and to reflect the subject light which passes through the optical finder unit such that a user can visually recognize the subject, and a evacuation position to which the half mirror evacuates from an optical axis of a subject light which enters through the image pickup optical system which is focused into an image on the image pickup device; and a mirror position instructing section which instructs the application position and the evacuation position by operation, wherein the mirror moving section moves the half mirror to a position instructed by the mirror position instructing section.

* * * * *